Figure 1:
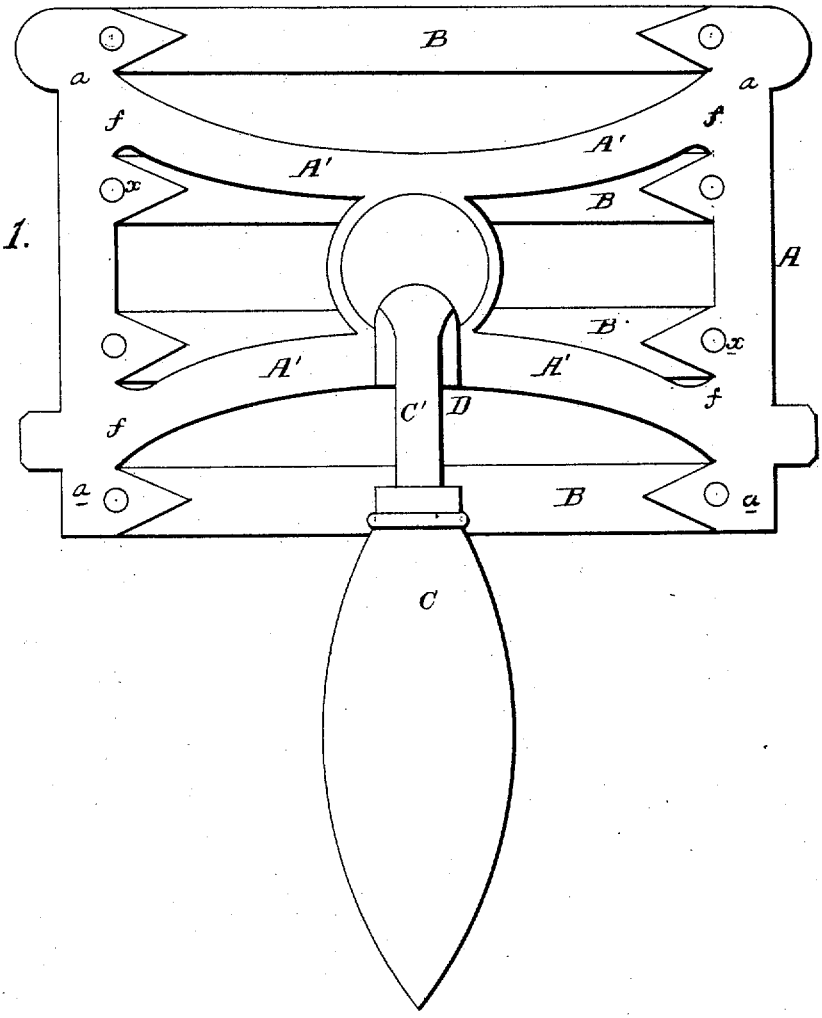
Figure 2:
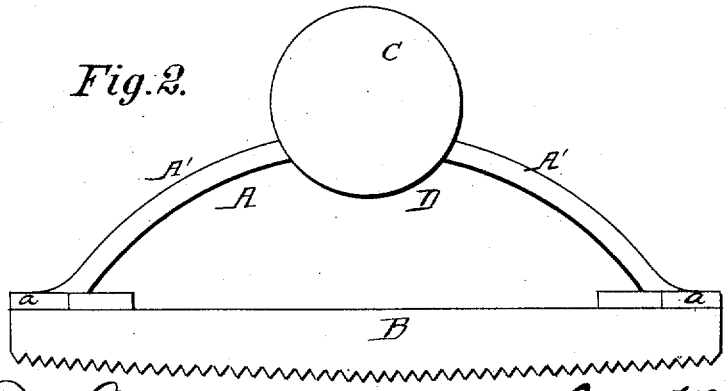

C. W. SALADEE.

CURRY-COMB.

No. 6,900. Reissued Feb. 1, 1876.

Witnesses:

Frank M. Gwynn.

Courtney A. Cooper.

Cyrus W. Saladee ass.

By his atty

Charles E. Foster

N. PETERS, PHOTO-LITHOGRAPHER, WASHINGTON, D. C.

UNITED STATES PATENT OFFICE.

CYRUS W. SALADEE, OF WASHINGTON, D. C., ASSIGNOR TO THE LAWRENCE CURRY-COMB COMPANY, OF NEW YORK, N. Y.

IMPROVEMENT IN CURRY-COMBS.

Specification forming part of Letters Patent No. 46,710, dated March 7, 1865; reissue No. 6,900, dated February 1, 1876; application filed January 20, 1876.

*To all whom it may concern:*

Be it known that I, CYRUS W. SALADEE, of Washington city, county of Washington, District of Columbia, but formerly of Putnam, Ohio, have invented an Improved Curry-Comb, of which the following is a specification:

This invention consists in a curry-comb provided with the ordinary side handle and with a supplemental device, by which is gained the desirable advantage of two separate ways of grasping the comb.

There are some positions in which the curry-comb must needs be used upon the horse that will not admit of grasping it immediately over the back, while there are other positions in which the comb cannot be handled unless a permanent hold can be had of it immediately over the back or teeth of the same.

By this invention the ordinary handle is supplemented by a device whereby a comfortable hold may be obtained upon the comb, whether grasped by the usual handle, or immediately over the top of the comb or teeth.

In the accompanying drawing, A represents the supplemental grasping device, made in the form of a frame, with the tang C′ permanently attached at the point where the bars A′ A′, constituting the frame, are united, said bars extending from the handle to the comb, and being united thereto at separate points *f f*. The frame is arranged so far above the comb-bars as to admit of the thumb passing beneath the usual side handle C′ at D, and there pressing against the rear bars or braces A′, the hand resting upon the frame, which serves as a support to retain it in a comfortable position above the back of the comb in grasping the latter. The toothed bars B are secured to the side bars *a* of the frame A by means of the rivets *x*, or by any other of the various well-known modes of doing the same.

Two metallic handles have been placed over the top of the comb with a view of giving a single hold upon the comb in that manner, as in the patent of Cyrus W. Saladee dated December 27, 1864. The results of this construction are, first, to divest the comb of the ordinary handle placed on or attached to the comb in the well-known right-angle position from the teeth; and, secondly, to permit the use of the comb by no other grasp or hold than by the two metallic handles placed parallel to each other near the side edges of the comb; but experience in the use of a comb constructed upon the plan of the patent aforesaid has shown the absolute necessity of combining with the old handle C a device that will admit of an additional comfortable grasp and support for the hand immediately over the top of the comb, as hereinbefore shown and described.

I claim—

1. A curry-comb in which the projecting side handle is supplemented by a grasping device extending over the back of the comb, and affording an additional grasp and support for the hand, substantially as set forth.

2. A curry-comb provided with the usual handle and with a supplementary grasping device above the back of the comb, whereby the latter may be held in different positions.

3. A curry-comb having a handle attached to it through the medium of a raised frame consisting of bars or braces extending from the handle over the back, and terminating in separate points of contact with the comb.

In testimony whereof I have signed my name to this specification in the presence of two subscribing witnesses.

CYRUS W. SALADEE.

Witnesses:

CHARLES E. FOSTER,
J. W. HAMILTON JOHNSON.